United States Patent
Tien

(10) Patent No.: US 9,660,683 B2
(45) Date of Patent: May 23, 2017

(54) PROTECTIVE COVER

(71) Applicant: HON HAI PRECISION INDUSTRY CO., LTD., New Taipei (TW)

(72) Inventor: Li-Wen Tien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 4 days.

(21) Appl. No.: 14/861,679

(22) Filed: Sep. 22, 2015

(65) Prior Publication Data
US 2017/0033824 A1 Feb. 2, 2017

(30) Foreign Application Priority Data
Jul. 31, 2015 (CN) .......................... 2015 1 0462214

(51) Int. Cl.
*H04M 1/00* (2006.01)
*F16M 11/04* (2006.01)
*H04B 1/3888* (2015.01)

(52) U.S. Cl.
CPC .................................. *H04B 1/3888* (2013.01)

(58) Field of Classification Search
CPC .................... A45F 2200/0516; H04R 2201/02
USPC ......... 455/575.8, 575.1, 550.1, 556.1, 556.2; 361/679.56, 679.01, 679.21; 206/764, 206/235; 248/176.3
See application file for complete search history.

(56) References Cited

U.S. PATENT DOCUMENTS

| | | | |
|---|---|---|---|
| 9,101,188 B2* | 8/2015 | Magness | G06F 1/1656 |
| 2007/0211420 A1* | 9/2007 | Bang | G06F 1/1626 361/679.27 |
| 2010/0072334 A1* | 3/2010 | Le Gette | F16M 11/041 248/176.3 |
| 2010/0142130 A1* | 6/2010 | Wang | F16M 13/00 361/679.01 |
| 2011/0103032 A1* | 5/2011 | Loi | F16M 11/10 361/809 |
| 2012/0314342 A1* | 12/2012 | Sheu | G06F 3/0231 361/679.01 |

* cited by examiner

Primary Examiner — Kiet Doan
(74) Attorney, Agent, or Firm — Steven Reiss

(57) ABSTRACT

A protective cover includes a housing and a support. The housing includes a receiving space for receiving a portable electronic device, an opening and a sliding rail. The support is received in the opening. The support includes a folding portion and a supporting portion. The folding portion includes a connecting element, a first main body, a second main body, and a free end. One end of the first main body is rotatably connected to one end of the opening by the connecting element, another end of the first main body, the second main body, and the free end are rotatably connected in turn. The free end is received in the sliding rail to slide along the sliding rail. One end of the supporting portion is fixed to the second main body, and another end of the supporting portion is free related to the first main body.

11 Claims, 7 Drawing Sheets

PROTECTIVE COVER

CROSS-REFERENCE TO RELATED APPLICATIONS

This application claims priority to Chinese Patent Application No. 201510462214.5 filed on Jul. 31, 2015.

FIELD

The subject matter herein generally relates to protective covers, and particularly to a protective cover for protecting and supporting portable electronic devices.

BACKGROUND

A variety of protective covers for panel-shaped electronic devices, such as smart phones, are used for protecting the electronic devices.

BRIEF DESCRIPTION OF THE DRAWINGS

Implementations of the present technology will now be described, by way of example only, with reference to the attached figures.

DETAILED DESCRIPTION

Figure 1:
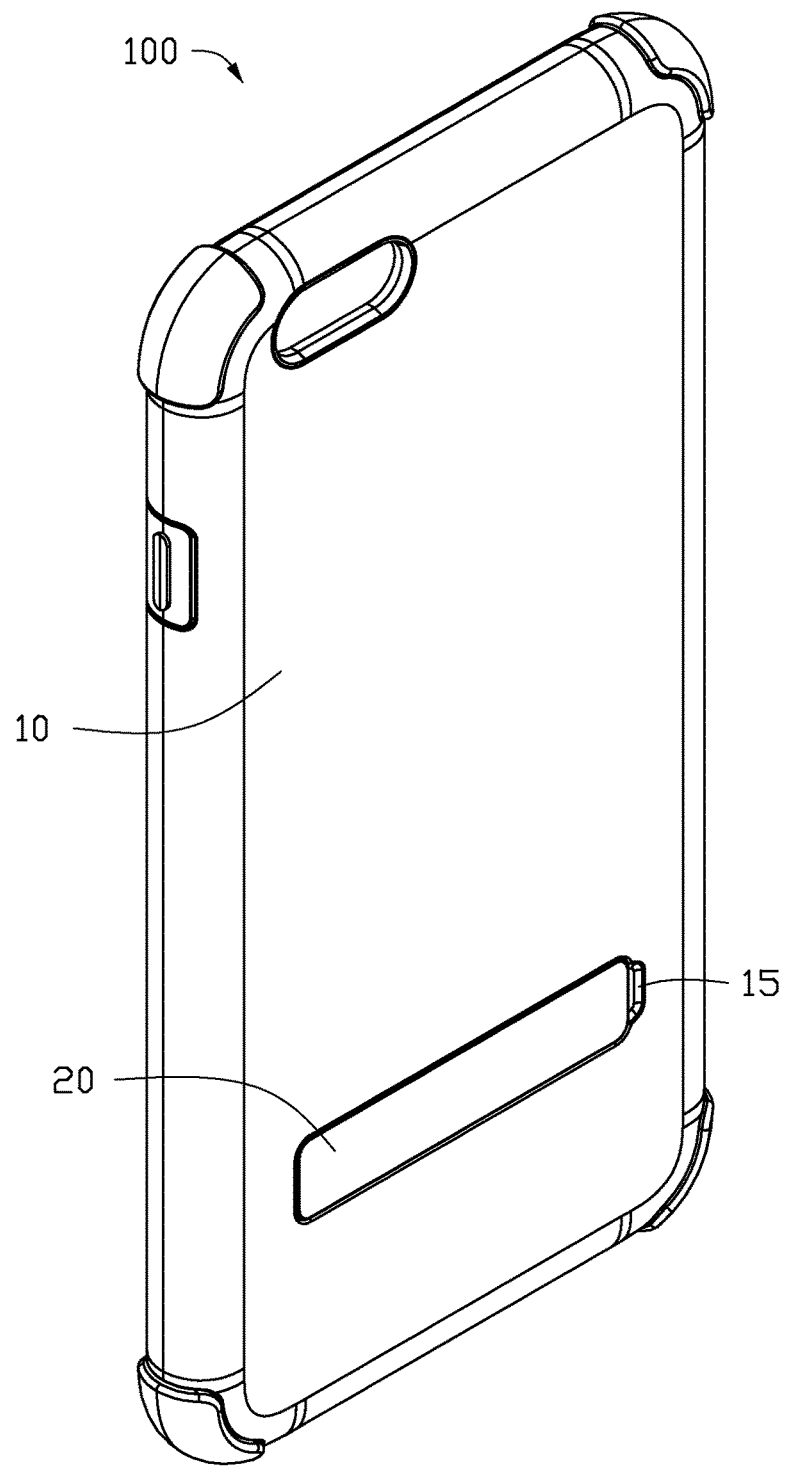
FIG. 1 is a front elevational view illustrating a first embodiment of a protective cover.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series and the like.

FIG. 1 illustrates a first embodiment of a protective cover 100. The protective cover 100 is used to protect and support portable electronic devices, for example smart phones and tablet computers.

The protective cover 100 can include a housing 10 and a support 20. The housing 10 is configured to receive and protect the portable electronic devices, and the support 20 is configured to support the housing 10.

Figure 6:
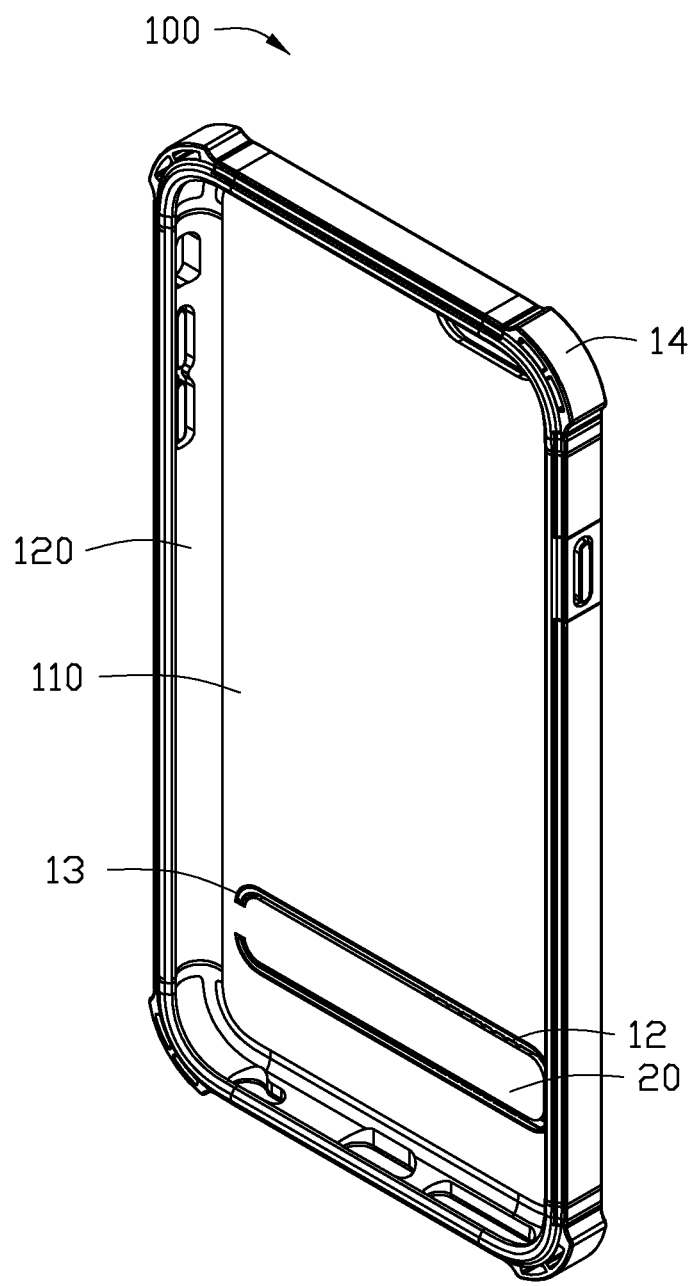
FIG. 6 is an isometric view illustrating a second embodiment of a protective cover.

The housing 10 includes a bottom surface 110 and four sidewalls 120, the bottom surface 110 and the four sidewalls 120 corporately form a receiving space 11. The receiving space 11 is configured to receive the portable electronic devices to be protected and supported. In the first embodiment, each of the four sidewalls 120 has a curved surface, as shown in FIG. 1, for example. In a second embodiment, each of the four sidewalls 120 has a flat surface, as shown in FIG. 6, for example.

Figure 2:
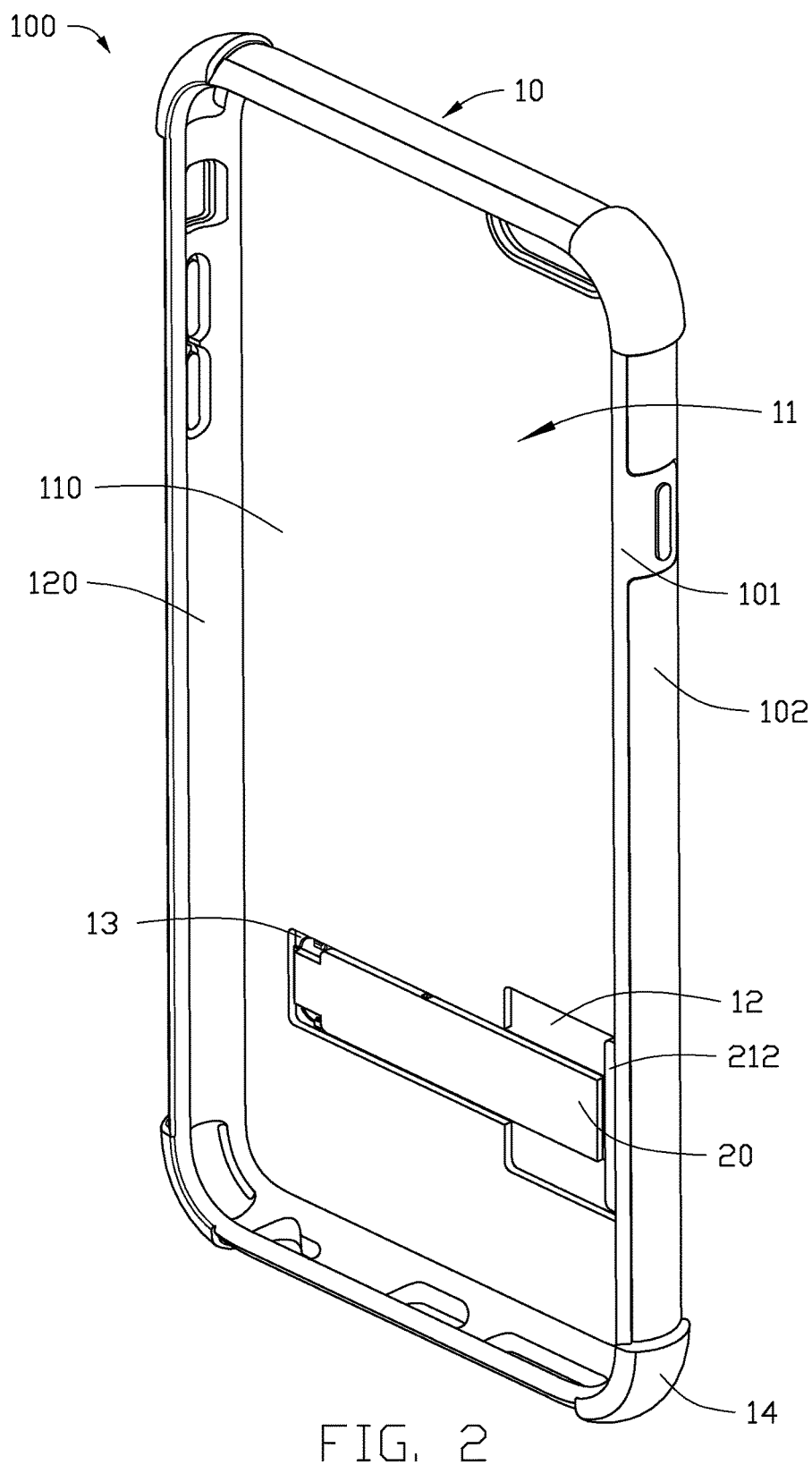
FIG. 2 is a rear elevational view of the protective cover of FIG. 1.
Figure 3:
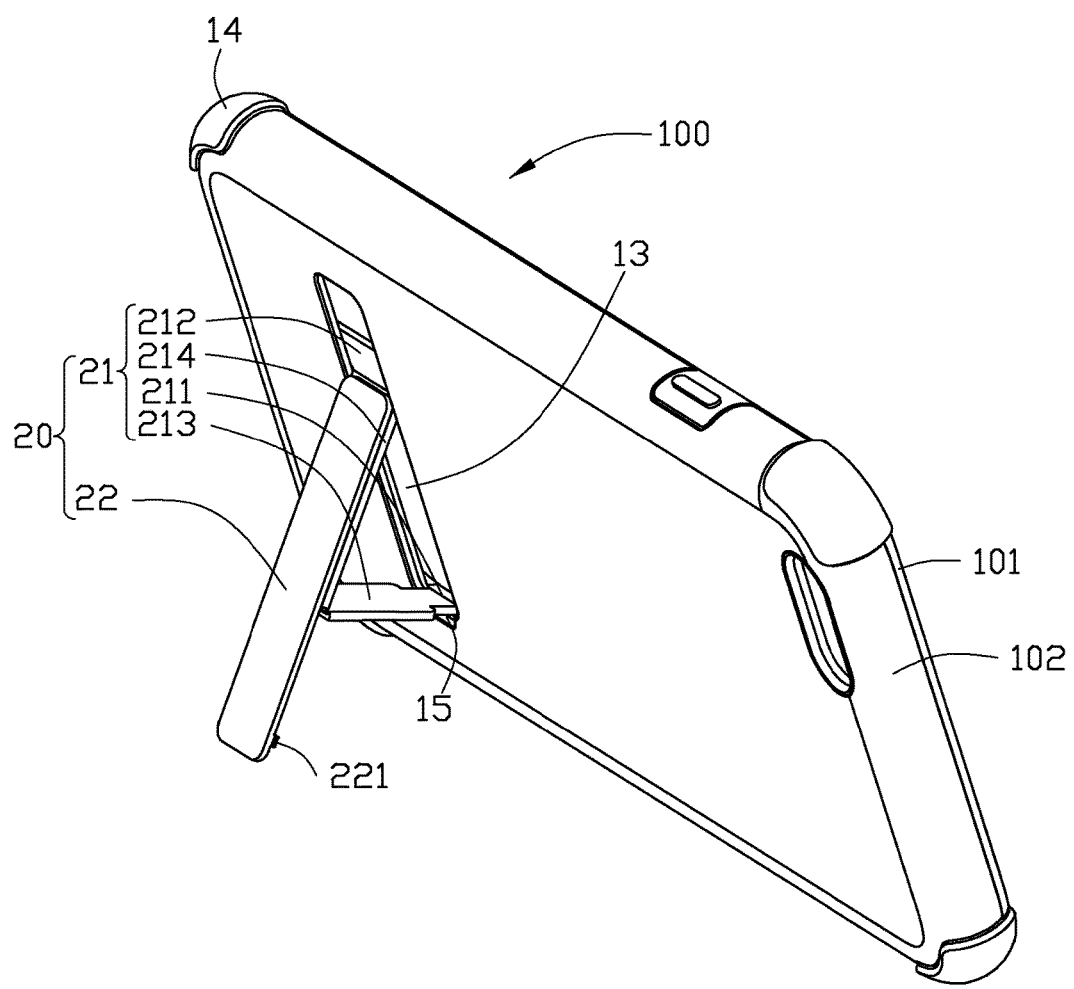
FIG. 3 is a first perspective view showing the protective cover of FIG. 1 in use.
Figure 4:
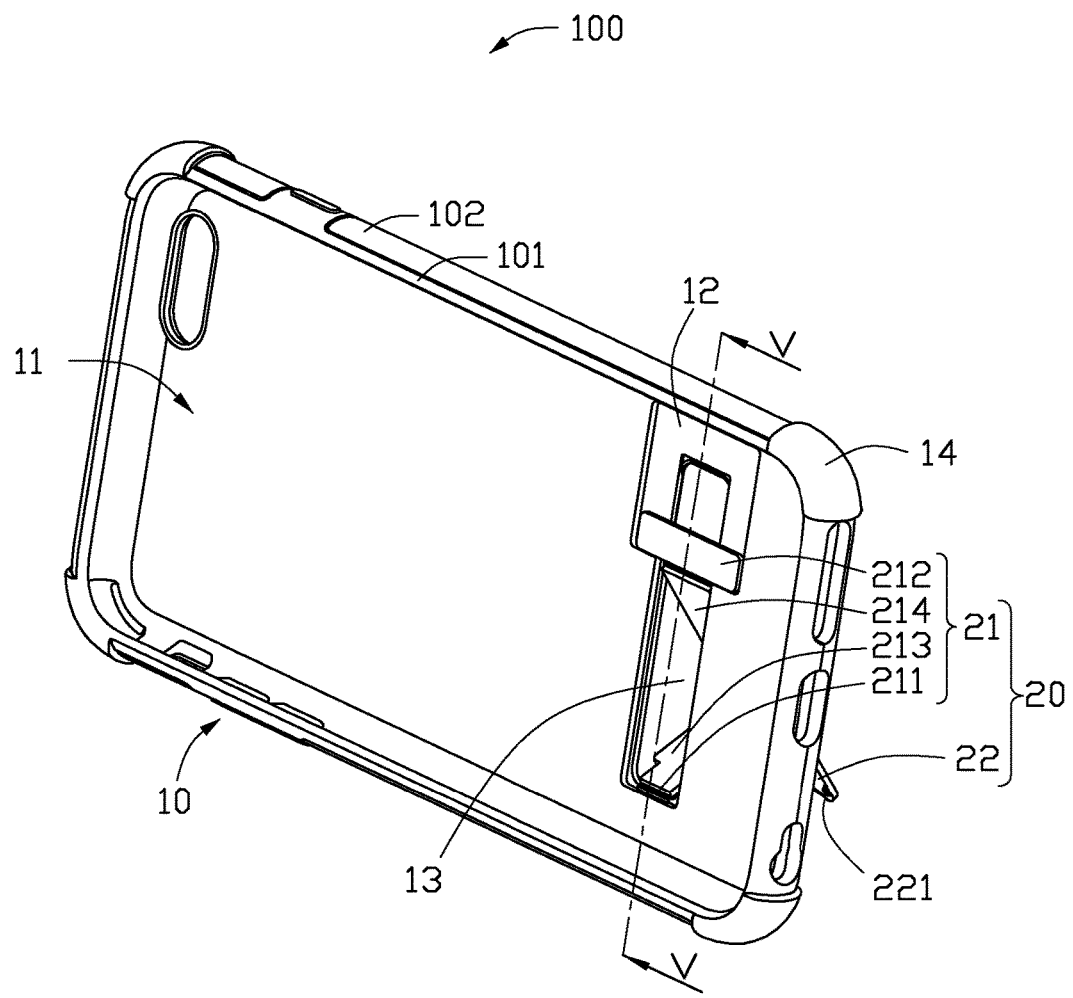
FIG. 4 is a second perspective view showing the protective cover of FIG. 1 in use.
Figure 7:
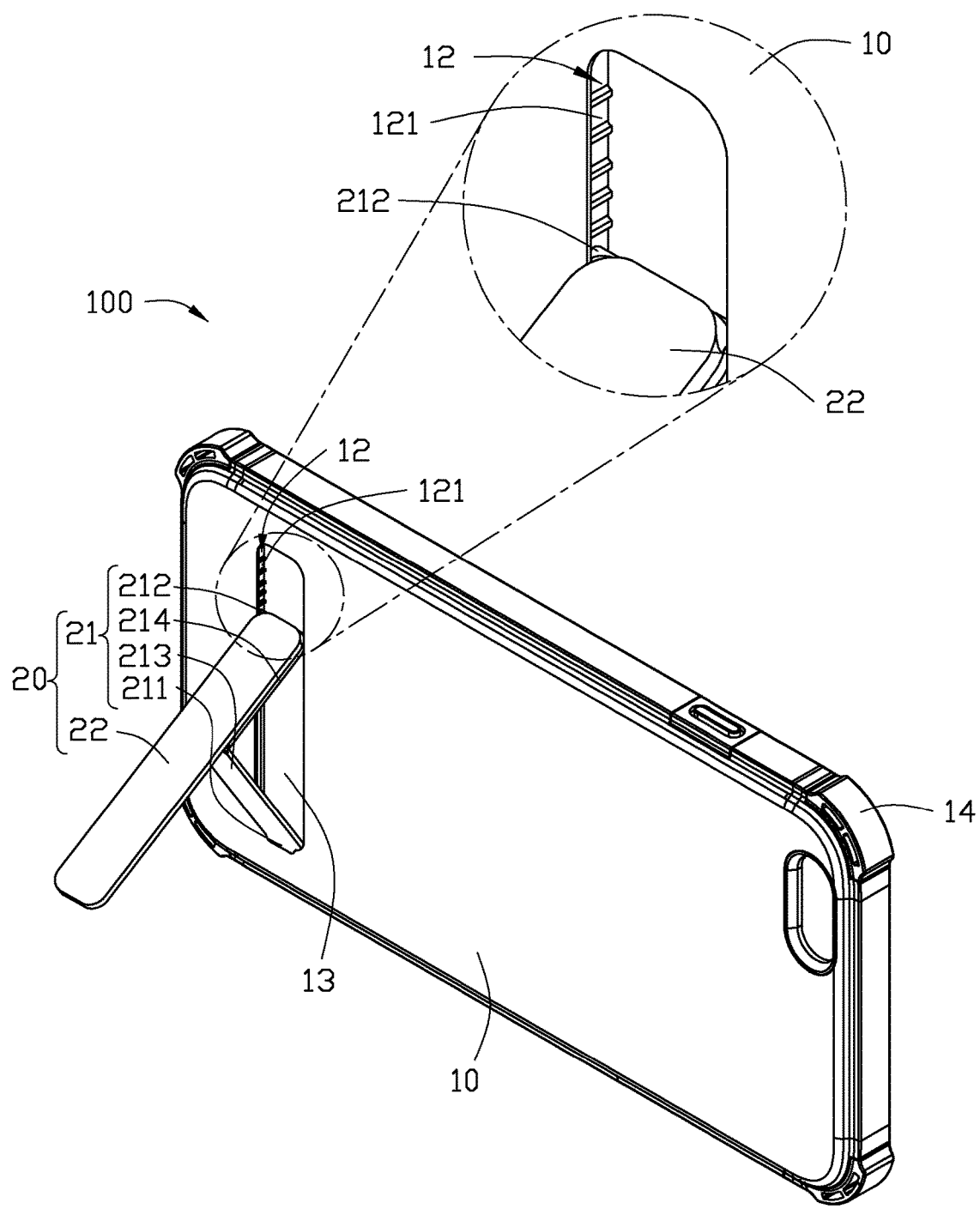
FIG. 7 is an isometric view showing the protective cover of FIG. 6 in use.

The bottom surface 110 defines a sliding rail 12 and an opening 13. The opening 13 is configured to receive the support 20. In the first embodiment, as shown in FIG. 2, FIG. 3 and FIG. 4, the opening 13 is a rectangular through hole, and the sliding rail 12 is a recessed area defined in an inner side of the bottom surface 110. The sliding rail 12 is in communication with one end of the opening 13. A width of the sliding rail 12 is greater than the width of the opening 13. In the second embodiment, as shown in FIG. 6 and FIG. 7, the sliding rail 12 is a rectangular through hole which is in communication with one end of the opening 13. A number of latching slots 121 are formed on two opposite sides of the sliding rail 12. The latching slots 121 are made of elastic material. It can be understand that the location of the sliding rail 12 and the opening 13 of the housing 10 is not limited. In at least one embodiment, a groove 15 is defined in an outer surface of the bottom surface 110, the groove 15 is located adjacent to an end of the opening 13 and is far away from the sliding rail 12.

In at least one embodiment, the housing 10 further includes an inner layer 101 and an outer layer 102. The inner layer 101 is wrapped by the outer layer 102. The inner layer 101 is made of elastic material, such as Polypropylene (PP), Thermoplastic Elastomer (TPE), especially Thermoplastic Polyurethanes (TPU), and other flexible material. The outer layer 102 is made of hard material, such as Polycarbonate (PC), metal materials (e.g. aluminum, steel), timber, and other inflexible materials.

In at least one embodiment, the housing 10 further can include at least one cushion structure 14, the at least one cushion structure 14 is mounted on an outer surface of the housing 10 to reduce an impact force when the protective cover 100 falls down. For example, in the first embodiment as shown in FIG. 1, the housing 10 includes four cushion structures 14, the four cushion structures 14 are respectively mounted on four corners of the housing 10. Each of the cushion structure 14 is projected from the inner layer 101 and extends out of the outer layer 102. The material of the cushion structures 14 is the same as the material of the inner layer 101. In the second embodiment, as shown in FIG. 6, the housing 10 includes four cushion structures 14, the four cushion structures 14 are elastic cushions respectively mounted on the four corners of the housing 10. Each of the elastic cushion defines at least one through hole (not shown) to form at least one air cavity. In the second embodiment, each of the elastic cushion is made of flexible material. In other embodiments, the cushion structure 14 further can be one or more sealed air sac mounted on the housing 10. It can be understood that the location and the number of the cushion structure 14 are not limited.

Refer to FIG. 3 to FIG. 5, and FIG. 7, in at least one embodiment, the support 20 includes a folding portion 21 and a supporting portion 22.

Figure 5:
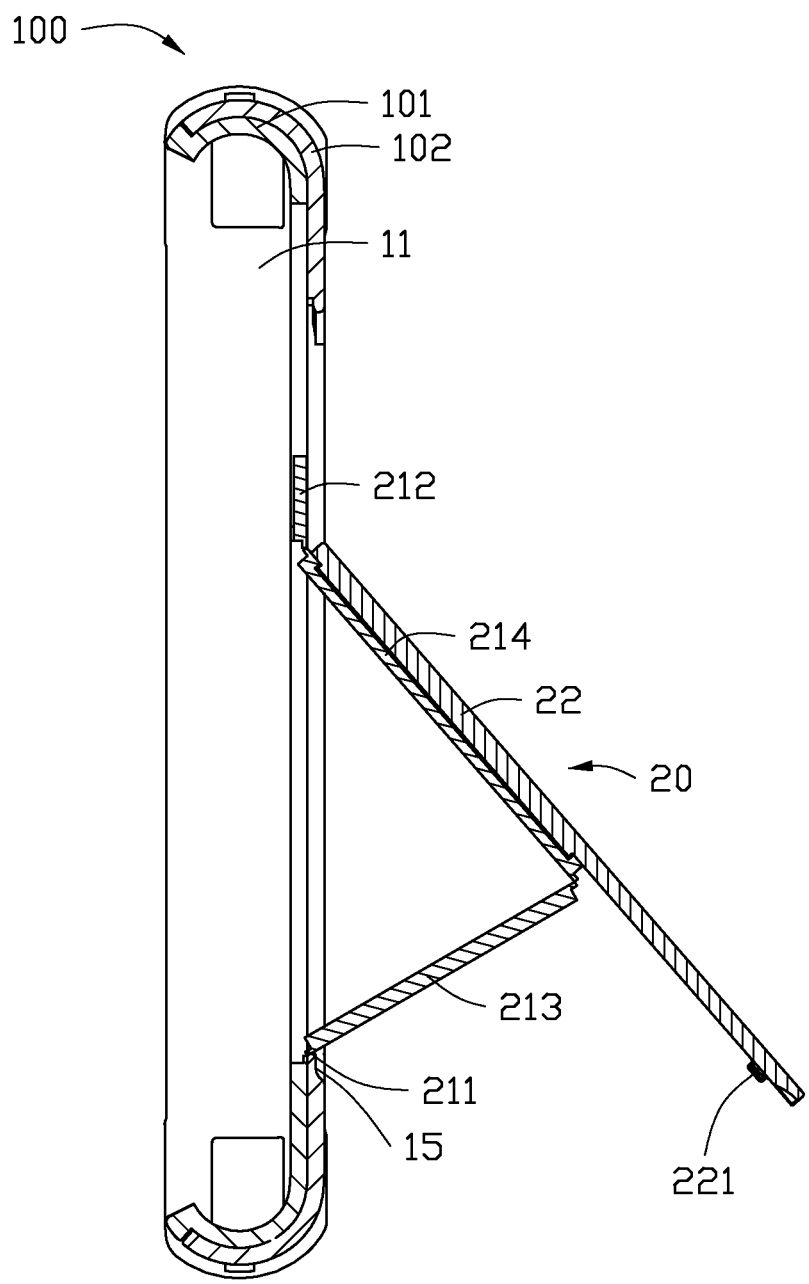
FIG. 5 is a cross sectional view of the protective cover taken along line V-V of FIG. 4.

The folding portion 21 can include a connecting element 211, a free end 212, a first main body 213, and a second main body 214. One end of the first main body 213 is rotatably connected to one end of the opening 13 via the connecting element 211. Another end of the first main body 213, the second main body 214, and the free end 212 are rotatably connected in turn. In the first embodiment as shown in FIG. 3 to FIG. 5, the width of the free end 212 is greater than the width of the second main body 214, thus the second main body 214 and the free end 212 form a T shape. The free end 212 is received in the sliding rail 12 and capable of sliding along the sliding rail 12. In the second embodiment as shown in FIG. 6 and FIG. 7, the free end 212 is fixed on the second main body 214, the width of the free end 212 is greater than the width of the second main body 214. In use, the free end 212 can be latched in different latching slots 121 of the sliding rail 12.

In at least one embodiment, the material of the folding portion 21 and the inner layer 101 are the same. The folding portion 21 and the inner layer 101 are integrally formed. In this embodiment, a thickness of the connecting element 211 is less than the thickness of the inner layer 101 and the first main body 213, thus, the first main body 213 is easily rotated related to the inner layer 101. The thickness of the first main body 213, the second main body 214, and the free end 212 are the same. A thickness of a connection portion between the first main body 213 and the second main body 214 is less than the thickness of the first main body 213, and the thickness of the connection portion between the second main body 214 and the free end 212 is less than the thickness of the second main body 214, thus the first main body 213, the second main body 214 and the free end 212 can be easily rotated related to each other. In other embodiments, the folding portion 21 further can be made of hard material, for example metal material, PC plastic, or timber. The connecting element 211, the first main body 213, the second main body 214 and the free end 212 can be rotatably connected in turn by rotating shafts.

The supporting portion 22 is strip-shaped. One end of the supporting portion 22 is fixed to the second main body 214, another end of the supporting portion 22 is free related to the first main body 213. The supporting portion 22 is made of hard material, for example metal material, alloy material, PC plastic, or timber. In at least one embodiment, the supporting portion 22 is fixed to the second main body 214 by using adhesive. In alternative embodiment, the supporting portion 22 is fixed to the second main body 214 by using mechanical connection means, for example screws, hooks, and hoops. In other embodiments, the supporting portion 22 and the second main body 214 further can be integrally formed by using the hard material.

A projection 221 is further projected from an inner surface of the supporting portion 22, the inner surface of the support 20 faces to the first main body 213. The first main body 213 further defines a slot (not shown) corresponding to the projection 221. When the support 20 is received in the opening 13, the projection 221 inserts to the slot of the first main body 213, thus the supporting portion 22 is fixed to the first main body 213.

It can be understand that the housing 10 further can include other structures corresponding to camera, earphone jack, volume keys and other structures of the portable electronic device to be protected and supported.

The use of the protective cover 100 will be described as follow.

In the first embodiment, in an initial state, as shown in FIG. 1 and FIG. 2, the support 20 is received in the opening 13, and the free end 212 of the folding portion 21 is received in an end of the sliding rail 12 that far away from the opening 13.

Refer to FIG. 3 to FIG. 5, in use, when a user pulls the supporting portion 22 in the groove 15, to move the supporting portion 22 in a direction far away from the housing 10, the supporting portion 22 brings the first main body 213 and the second main body 214 to move in a direction away from the housing 10, meanwhile, the free end 212 of the folding portion 21 slides along the sliding rail 12 in a direction close to the opening 13. Thus, the first main body 213, the supporting portion 22 and the bottom surface 110 form an A shape. When the housing 10 receiving the portable electronic device is putted in a flat surface (i.e. a desk), the housing 10 and the supporting portion 22 resist the top of the flat, thus the support 20 supports the housing 10 with the portable electronic device standing on the flat surface.

In the second embodiment, see FIG. 6, in an initial state, the support 20 is received in the opening 13, and the free end 212 of the folding portion 21 is received in an end of the sliding rail 12 that far away from the opening 13.

In use, refer to FIG. 7, when a user pulls the supporting portion 22 to move the supporting portion 22 in a direction far away from the housing 10, the supporting portion 22 brings the first main body 213 and the second main body 214 to move in a direction away from the housing 10, meanwhile, the free end 212 of the folding portion 21 slides along the sliding rail 12 in a direction close to the opening 13, and the latching slots 121 are deformed when the free end 212 moves along the sliding rail 12. Then the free end 212 can be latched in one of the latching slots 121. The first main body 213, the supporting portion 22 and the bottom surface 110 form an A shape. When the housing 10 receiving the portable electronic device is putted in a flat surface (i.e. a desk), the housing 10 and the supporting portion 22 resist the top of the flat, thus the support 20 supports the housing 10 with the portable electronic device standing on the flat surface.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A protective cover to protect and support a portable electronic device, the protective cover comprising:
   a housing defining a receiving space, an opening, and a sliding rail, the receiving space configured to receive the portable electronic device; and
   a support received in the opening,
   wherein the housing comprises at least one cushion structure, the at least one cushion structure defines at least one through hole to form at least one air cavity;
   the support comprises a folding portion and a supporting portion, the folding portion comprises a connecting element, a first main body, a second main body, and a free end;
   one end of the first main body is rotatably connected to one end of the opening by the connecting element, another end of the first main body, the second main body, and the free end are rotatably connected in turn;
   the free end is received in the sliding rail to slide along the sliding rail;
   one end of the supporting portion is fixed to the second main body; and another end of the supporting portion is free related to the first main body;
  further comprising an inner layer and an outer layer, wherein the inner layer is wrapped by the outer layer;
  wherein the inner layer is made of flexible material, the outer layer is made of hard material; and
  wherein the folding portion of the support and the inner layer are integrally formed, a thickness of the connecting element is less than a thickness of the inner layer and a thickness of the first main body; a thickness of a connection portion between the first main body and the second main body is less than the thickness of the first main body, and a thickness of a connection portion between the second main body and the free end is less than the thickness of the second main body.

2. The protective cover according to claim 1, wherein the flexible material comprises Polypropylene, Thermoplastic Elastomer, and Thermoplastic Polyurethanes.

3. The protective cover according to claim 1, wherein the materials of the folding portion and the inner layer are the same, and the supporting portion is made of hard material.

4. The protective cover according to claim 1, wherein the at least one cushion structure is projected from the inner layer and extends out of the outer layer.

5. The protective cover according to one of claim 1, wherein the sliding rail is a through hole throughout the inner layer and the outer layer, a plurality of latching slots are defined in two opposite sides of the sliding rail, the latching slots are configured to latch the free end.

6. The protective cover according to claim 5, wherein the latching slots are made of flexible material.

7. The protective cover according to claim 1, wherein the at least one cushion structure is mounted on an outer surface of the housing, the at least one cushion structure is selected from a group consisting of an elastic cushion and a sealed air sac which is made of flexible material.

8. The protective cover according to claim 1, wherein the folding portion is made of hard material, the connecting element, the first main body, the second main body, and the free end can be rotatably connected by rotating shafts.

9. The protective cover according to claim 1, wherein the supporting portion is fixed to the second main body by using one of an adhesive and mechanical connection means.

10. The protective cover according to claim 1, wherein the supporting portion and the second main body are integrally formed by using hard material.

11. The protective cover according to claim 1, wherein the housing further comprises a bottom surface, the sliding rail is a recessed area defined in an inner side of the bottom surface, a width of the sliding rail is greater than a width of the opening; a width of the free end received in the sliding rail is greater than a width of the second main body.

* * * * *